(12) United States Patent
Vosbikian

(10) Patent No.: US 8,006,642 B2
(45) Date of Patent: Aug. 30, 2011

(54) CONTAINER AND POLE PROTECTION SYSTEM

(75) Inventor: Peter S. Vosbikian, Moorestown, NJ (US)

(73) Assignee: Zenith Innovation, LLC, Delran, NJ (US)

( * ) Notice: Subject to any disclaimer, the term of this patent is extended or adjusted under 35 U.S.C. 154(b) by 106 days.

(21) Appl. No.: 12/584,972

(22) Filed: Sep. 15, 2009

(65) Prior Publication Data

US 2010/0147222 A1    Jun. 17, 2010

(51) Int. Cl.
*A01K 39/01* (2006.01)

(52) U.S. Cl. .................................. 119/52.2; 119/57.9

(58) Field of Classification Search ............ 119/52.2, 119/52.3, 57, 57.6, 57.9, 61.3, 61.57, 81, 119/900

See application file for complete search history.

(56) References Cited

U.S. PATENT DOCUMENTS

| | | | | |
|---|---|---|---|---|
| 3,145,690 A * | 8/1964 | Bachman | ..................... | 119/52.3 |
| 3,301,217 A * | 1/1967 | Prowinsky | ................... | 119/57.9 |
| 4,031,856 A * | 6/1977 | Chester | ......................... | 119/57.9 |
| 5,289,796 A * | 3/1994 | Armstrong | ................... | 119/52.3 |
| 5,355,835 A * | 10/1994 | Freed | ............................. | 119/57.9 |
| 5,558,040 A * | 9/1996 | Colwell et al. | ............... | 119/52.2 |
| 6,016,768 A * | 1/2000 | Colucci | ......................... | 119/57.9 |
| 6,401,658 B1 * | 6/2002 | Teets | ............................. | 119/57.9 |
| 6,532,894 B2 * | 3/2003 | Johnson | ....................... | 119/52.3 |
| 6,640,746 B1 * | 11/2003 | Lund | ............................. | 119/57.9 |
| 7,798,099 B2 * | 9/2010 | Vosbikian | .................... | 119/52.3 |

* cited by examiner

*Primary Examiner* — Yvonne R. Abbott
(74) *Attorney, Agent, or Firm* — Stuart M. Goldstein

(57) ABSTRACT

Protection of the pole of a vertically slideable bird feeder and the prevention of loss of bird feed if the filled or partially filled feeder is removed from the pole is accomplished by a specially designed protective sheath located within the feed tube housing of the feeder and around the pole. The upper end of the sheath is held in place within a channel formed in the feed filling funnel. The lower end of the sheath is held in place within a second channel formed in the bird feed tray on which the feed tube housing rests. Upstanding walls within the filling funnel are configured to ensure that feed is poured into the feed tube housing with minimal loss of feed at the pole. The feed filling funnel, feed tube housing, protective sheath, and bird feed tray, are all vertically moveable as a single unit along the pole, without causing damage to or undue feed residue buildup on the pole, while maintaining the integrity of the feed in the feed tube housing. In alternate embodiments, the protective sheath is integrally connected to or formed with other components of the system. The protective sheath concept is also adaptable to other pole mounted containers, such as hanging plant pots and similar suspended receptacles.

20 Claims, 5 Drawing Sheets

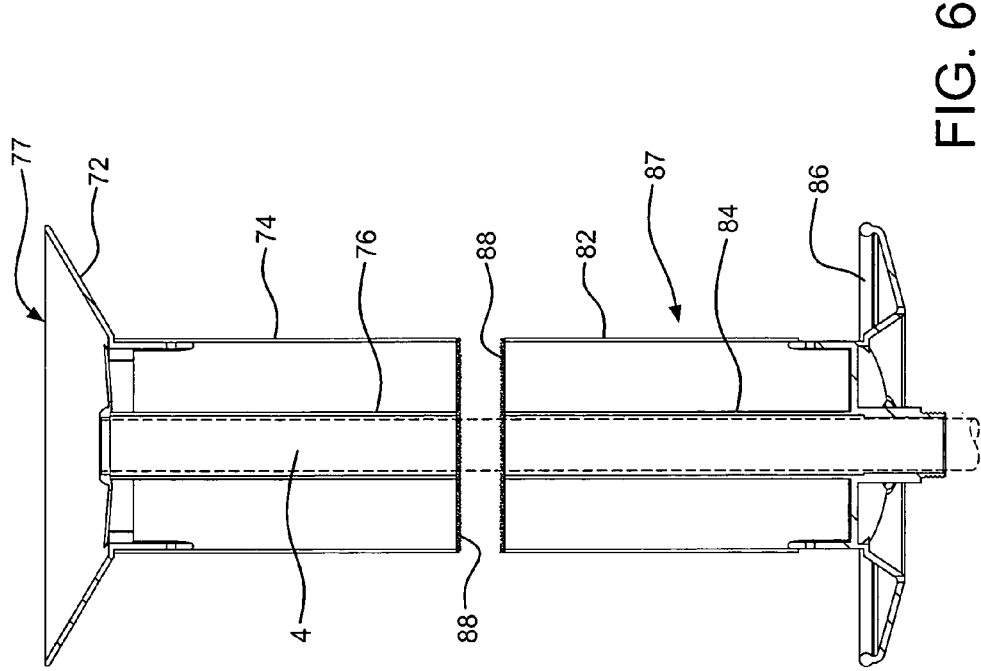
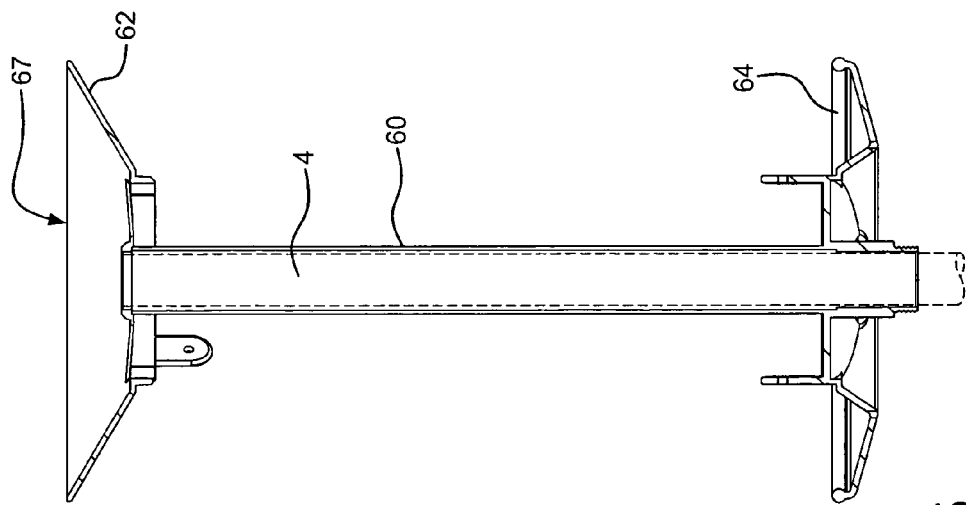
FIG. 6
FIG. 5

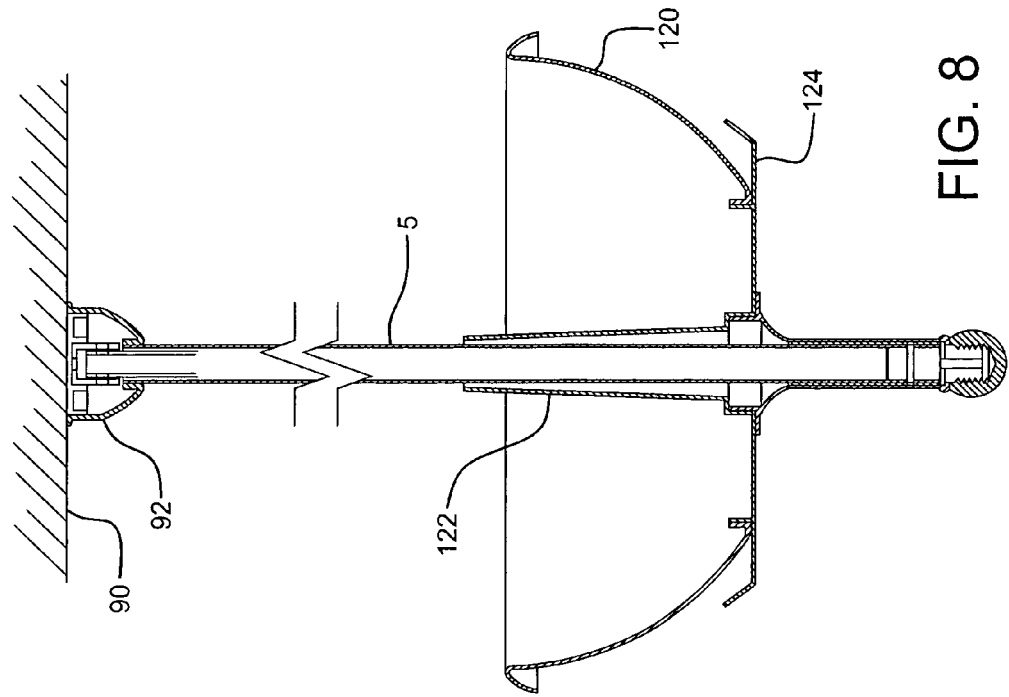
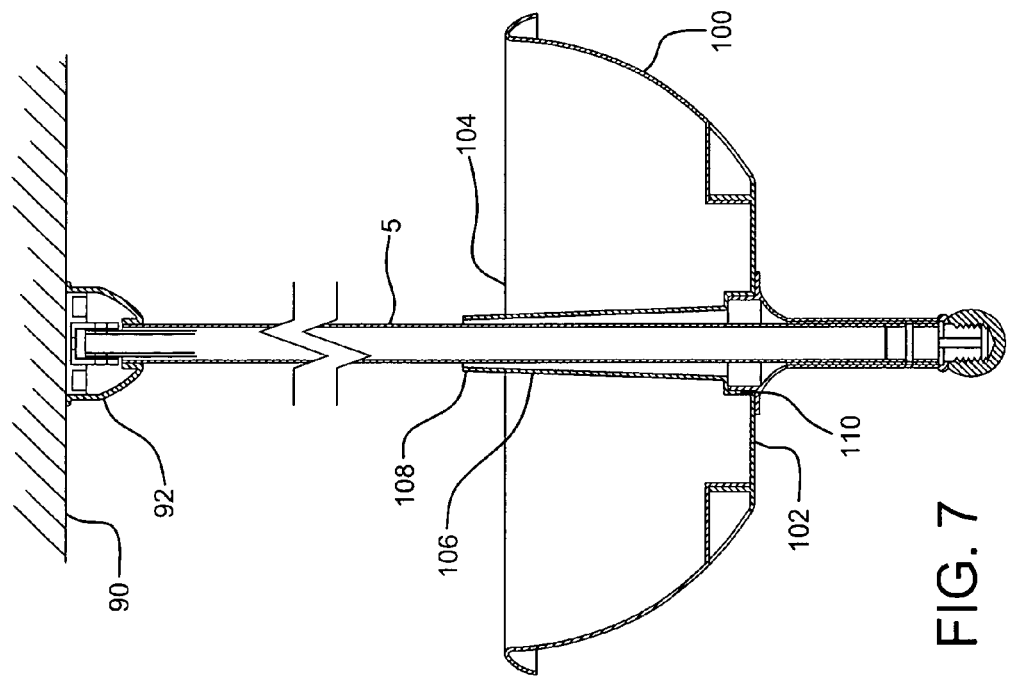

CONTAINER AND POLE PROTECTION SYSTEM

This application claims the benefit of parent application Ser. No. 12/316,500 filed on Dec. 13, 2008.

BACKGROUND OF THE INVENTION

Co-pending U.S. application Ser. No. 12/228,108 discloses a unique modular bird feeder system which is slideably mounted on a vertically standing pole. In that system; bird feed is poured through a feed filling funnel into a feed housing tube, both components being configured to slide up and down the pole as a single unit and to be maintained in a lowered position, thus allowing easy access for filling. However, operational issues arise with this feeder as the housing tube is slid vertically along the pole. Upon continued use, the feed in the housing tube contacts and abrasively rubs the surface of the pole, resulting in the pole becoming cut and scratched and causing a buildup of feed residue on the pole's surface. This causes unsightly, unattractive marks on the pole. It also inhibits the smooth movement of the feeder components along the pole. Protection of the pole such that these problems are addressed is a key objective.

In addition, if the assembled bird feeder is removed from the pole and there is feed in the feed housing tube, feed will spill out of the feeder. Thus, removal of an assembled, filled feeder from its pole will result in substantial, irretrievable loss of feed. Eliminating this wasteful loss of feed is an important objective.

SUMMARY OF THE INVENTION

The system of the present invention solves the problem of the continuous damaging of the bird feeder pole and the loss of bird feed from the feeder when the filled or partially filled feeder is removed from the pole, by providing a specially designed isolation, protective sheath located within the feed container or feed tube housing and around the pole. The upper end of the sheath is held in place within a channel formed in the feed filling funnel. The lower end of the sheath is held in place within a second channel formed in the bird feed tray on which the feed tube housing rests. This system allows for the removal of an assembled, filled bird feeder from its pole without loss of feed. Upstanding walls within the filling funnel are configured to ensure that feed is poured into the feed tube housing with minimal loss of feed at the pole. The feed filling funnel, feed tube housing, protective sheath, and bird feed tray, are all vertically moveable as a single unit along the pole, without causing damage to or undue feed residue buildup on the pole, while maintaining the integrity of the feed in the feed tube housing. In alternate embodiments, the protective sheath is integrally connected to or formed with other components of the system. The protective sheath concept is also adaptable to other pole mounted containers such as hanging plant pots and similar suspended receptacles.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

BRIEF DESCRIPTION OF THE DRAWINGS

FIG. 5 is a cross-sectional view of another embodiment of components of the system of the present invention.

FIG. 6 is a cross-sectional view of another embodiment of components of the system of the present invention.

FIG. 7 is a cross-sectional view of an embodiment of the invention in conjunction with a suspended pole mounted container which may be used as a planter.

FIG. 8 is a cross-sectional view of another embodiment of the invention shown in FIG. 7.

DETAILED DESCRIPTION OF THE INVENTION

Figure 1:
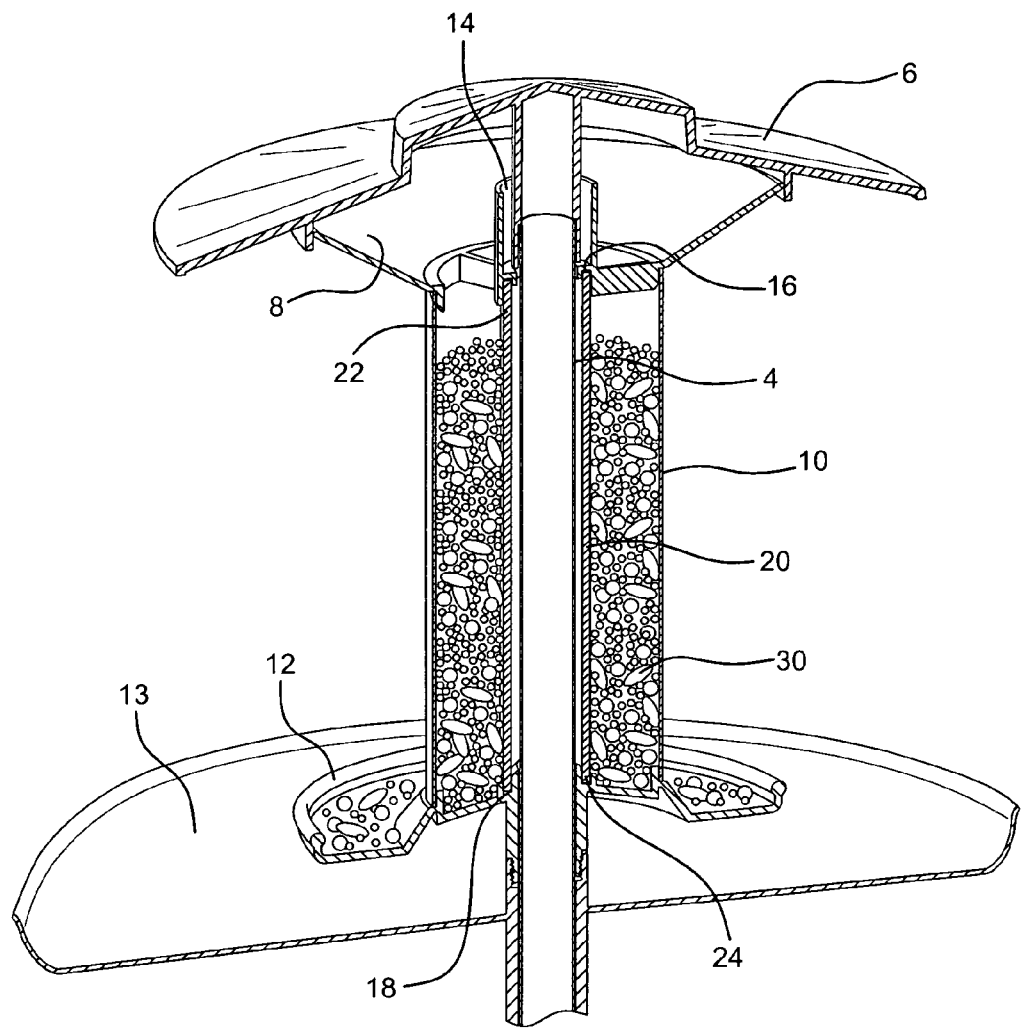
FIG. 1 is a cross-sectional view of the components of the system of the present invention in its raised, bird feeding configuration.
Figure 2:
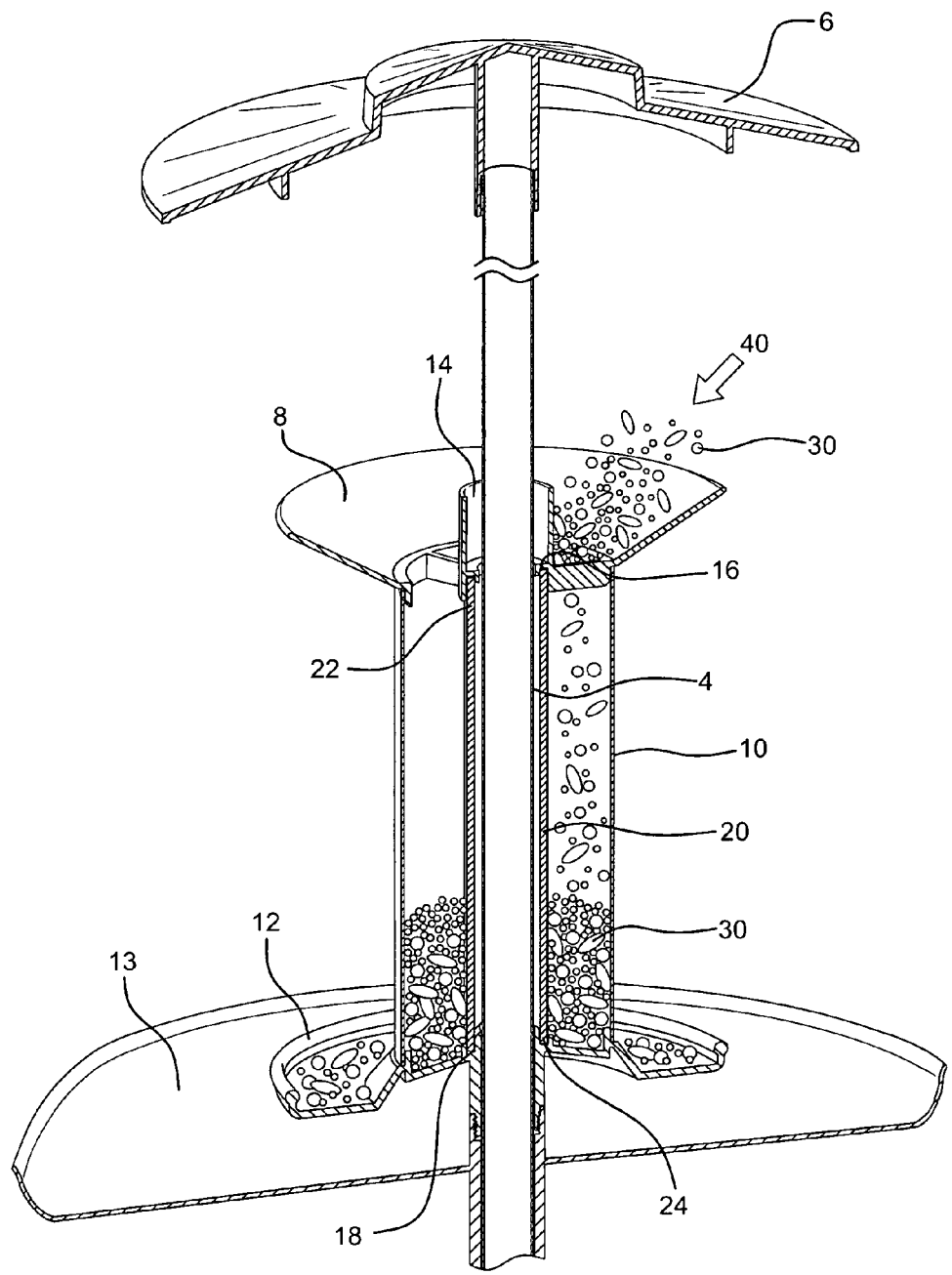
FIG. 2 is a cross-sectional view of the system of the present invention, showing the feed filling operation, evidencing the manner in which the feeder's pole is protected.

The container fill and pole protection system of the present invention is configured to be incorporated into a modular bird feeder, comprising elongated vertically standing pole 4, feeder roof 6, bird feed receptacle or feed filling funnel 8, feed container or feed housing tube 10, and upper bird feed tray 12. Lower feed tray 13 is also provided as an option on the bird feeder. Feed filling funnel 8, feed housing tube 10, upper bird feed tray 12, and lower feed tray 13 if included, are vertically slideable as a single unit along pole 4 to a lower position on the pole, thus providing ease of feed filling access to the feed housing tube, as described in further detail in the aforementioned co-pending U.S. application Ser. No. 12/228,108, the subject matter of which is incorporated herein.

The present system modifies feed filling funnel 8 with circumferential, upstanding sleeve type wall 14. Feed filling funnel 8 also has circumferential channel 16 which opens downwardly into feed housing tube 10. Upper bird feed tray 12 has circumferential channel 18 opening upwardly into feed housing tube 10. Isolating or protective sheath 20 is an elongated, tubular component sized to closely surround and encircle pole 4. Upper end 22 of sheath 20 is positioned within channel 16 of feed filling funnel 8 and lower end 24 of the sheath is positioned within channel 18 of upper bird feed tray 12. When so positioned, sheath 20 is maintained in position between feed filling funnel 8 and upper bird feed tray 12, but is also slideable up and down pole 4 along with the other moveable components of the bird feeder 2. That is, feed filling funnel 8, feed tube housing 10, protective sheath 20, upper bird feed tray 12, and lower bird feed tray 13, again if included, are all vertically moveable, as a single unit along pole 4.

When it is desired to fill the bird feeder, the moveable feeder components, i.e. feed filling funnel 8, feed housing tube 10, upper bird feed tray 12, and sheath 20, are unlocked from their bird feeding positions atop pole 4 and are slid down pole 4, as described in application Ser. No. 12/228,108, such that the feed filling funnel is at a convenient height for easy user access. Bird feed 30 is then poured 40 into feed filling funnel 8, where it enters feed housing tube 10. Upstanding walls 14 of feed filling funnel 8 prevent the unwanted entry of feed 30 in areas around pole 4, including in between pole 4 and sheath 20. Sheath 20 itself separates feed 30 from pole 4, also preventing the feed from contacting the surface of the pole, and thus protecting the pole from scratches and other harmful abrasions. By keeping feed from contacting pole 4, sheath 20 also prevents buildup of feed residue on the surface of the pole. After feed housing tube 10 is filled with feed 30, the feeder components are slid up pole 4 to roof 6, where the moveable feeder components are returned to and locked into feeding position on the pole, as described in application Ser. No. 12/228,108.

Thus, by the container fill and pole protection system of the present invention, bird feed 30 is easily and efficiently added, without spillage and loss of feed. Significantly, the bird feeder whose feed housing tube 10 is filled or partially filled with feed, can be removed from pole 4 cleanly and without spillage of feed from the feeder. In addition, sheath 20 prevents feed from impacting and abrading the surface pole 4 and from causing a feed residue buildup on the pole's surface as the moveable components of the bird feeder are slid up and down the pole. Keeping pole 4 free of cuts, scratches and similar abrasions, and of feed residue, not only preserves the appearance of the pole, but also ensures that the slideable operation of the bird feeder up and down the pole remains unimpeded.

Figure 3:
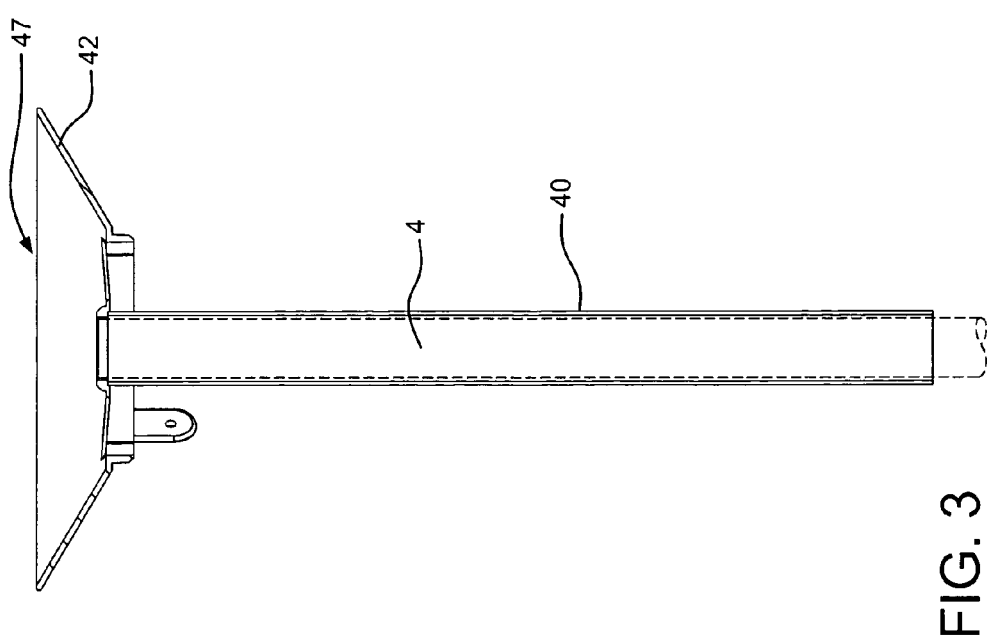
FIG. 3 is a cross-sectional view of an alternate embodiment of components of the system of the present invention.

FIG. 3 shows an alternate means of configuring the components of the present invention. Sheath 40 in this embodiment is connected to feed filling funnel 42 as a single unit. Optimally, this is accomplished by molding these components into one integral unit 47 which can be slid up and down pole 4.

Figure 4:
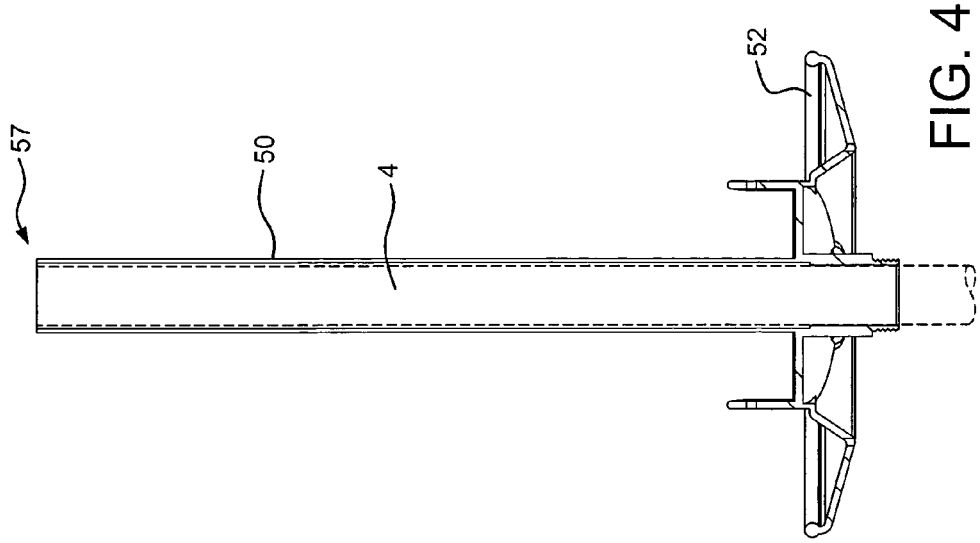
FIG. 4 is a cross-sectional view of another embodiment of components of the system of the present invention.

FIG. 4 shows another means of configuring the components of the present invention. Sheath 50 in this embodiment is connected to bird feed tray 52 as a single unit. Again, this is optimally accomplished by molding these components into one integral unit 57 which can be slid up and down pole 4.

FIG. 5 shows yet another means of configuring the components of the present invention. Sheath 60 in this embodiment is connected to both feed filling funnel 62 and bird feed tray 64 as a single unit. Once again, this is optimally accomplished by molding these components into one integral unit 67 which can be slid up and down pole 4.

FIG. 6 shows still another means of configuring the components of the present invention. Upper bird feeder member 77 comprises feed filling funnel 72, upper bird feed housing section 74, and upper sheath section 76 interconnected to form the upper bird feeder member. Lower bird feeder member 87 comprises lower bird feed housing section 82, lower sheath section 84, and bird feed tray 86 also interconnected to form the lower bird feeder member. Both the upper bird feeder member 77 and lower bird feeder member 87 are, optimally, molded as integral pieces, and they are configured to be connected by means of high strength adhesive 88. Screws, rivets, male/female threaded engagement elements or any other type of attachment means located at the cojoining ends of the two members can be used to attach upper feeder member 77 to lower feeder member 87. The resulting product is a fully assembled and integral birdfeeder, with protective sheath, which is designed to slide up and down its vertically standing supporting pole.

FIG. 7 shows an embodiment of the invention employed in conjunction with pole mounted container 100, which is mounted on and slideable along pole 5, suspended from overhead surface 90 by overhead attachment device 92. Container 100 may be a plant pot or similar hanging receptacle. Protective sheath 106 is located within container 100 and extends upward between bottom end 102 to a point above top end 104 of the container. Sheath 106, like container 100, is slideably mounted on pole 5 and has tapered side walls. Top end 108 of sheath 106 extends above top end 104 of container 100 and is sized to closely surround and encircle pole 5. By this design configuration, sheath 106 prevents the entry and buildup of unwanted debris around the surface of pole 5. This is especially critical in preventing soil around plants from coming into contact with pole 5, when container 100 is used as a planter.

In the embodiment shown in FIG. 7, sheath 106 is integrally formed within container 100. As previously described with regard to the embodiment shown in FIGS. 3-6, this is optimally accomplished by molding these components as one unit, such that bottom end 110 of sheath 106 is integral with bottom end 102 of container 100. The resulting product is a fully integrated container with protective sheath, designed to slide up and down pole 5 and which eliminates entry and buildup of debris around the surface of the pole. This protects the surface of pole 5 from scratches and other harmful abrasions. The elimination of debris will also allow container 100 to effectively and efficiently slide up and down along pole 5.

FIG. 8 shows another variation of the system shown in FIG. 7. In this embodiment, container 120 is integrally formed, not only with protective sheath 122, but with outwardly extended drip pan 124, when container 120 is to be used for potted plants. The entire integral unit is thus slideably mounted for up and down movement along pole 5.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A container fill and pole protection system for a bird feeder having a feed housing and a bird feed tray slideably mounted on an elongated vertically standing pole with an outside surface and an upper end, said system comprising:
   sheath means for protecting the surface of the pole from scratches and other harmful abrasions, for eliminating the entry and buildup of feed residue around the surface of the pole, and for preventing the loss of feed when the feed housing is removed from the pole, said sheath means having upper and lower ends and being slideably mounted on and encircling the pole;
   bird feed receptacle means for facilitating filling of the feed housing means with bird feed, said receptacle means being removeably positioned on the feed housing and around the pole and having channel means for receiving the upper end of the sheath means; and
   second channel means for receiving the lower end of the sheath means to the feed tray, said second channel means being upstanding from the bird feed tray, whereby the sheath means, feed tray, receptacle means, and feed housing are slideable as a single unit up and down along the pole.

2. The container fill and pole protection system as in claim 1 wherein the sheath means comprises an elongated tubular member.

3. The container fill and pole protection system as in claim 1 wherein the bird feed receptacle means comprises a funnel member configured to be positioned atop the feed housing.

4. The container fill and pole protection system as in claim 1 wherein the bird feed receptacle means comprises upstanding wall means for preventing bird feed from contacting the sheath means and the pole and for assisting in the prevention of loss of feed when the feed housing is removed from the pole.

5. The container fill and pole protection system as in claim 4 wherein the wall means comprises a sleeve type member configured to circumscribe the upper end of the pole.

6. The container fill and pole protection system as in claim 1 wherein the sheath means extends from the bird feed receptacle means to the bird feed tray.

7. A container fill and pole protection system for a bird feeder having a feed housing and a bird feed tray slideably mounted on an elongated vertically standing pole with an outside surface and an upper end, said system comprising:
- a protective isolation sheath located within the feed housing and being slideably mounted on and encircling the pole, said sheath having upper and lower ends;
- a filling funnel removeably positioned on the feed housing and around the pole, said filling funnel having a channel into which the upper end of the sheath means is positioned; and
- a second channel means upstanding from the bird feed tray into which the lower end of the sheath is positioned, the sheath, bird feed tray, filling funnel, and feed housing being slideable as a single unit up and down along the pole.

8. The container fill and pole protection system as in claim 7 wherein the sheath comprises an elongated tubular member.

9. The container fill and pole protection system as in claim 7 wherein the filling funnel comprises a wall within the filling funnel, upstanding from the feed housing.

10. The container fill and pole protection system as in claim 9 wherein the wall comprises a sleeve type member configured to circumscribe the upper end of the pole.

11. The container fill and pole protection system as in claim 7 wherein the sheath extends from the filling funnel to the bird feed tray.

12. A container fill and pole protection system for a bird feeder having a feed housing slideably mounted on an elongated vertically standing pole with an outside surface and an upper end, said system comprising:
- sheath means for protecting the surface of the pole from scratches and other harmful abrasions, for eliminating the entry and buildup of feed residue around the surface of the pole, and for preventing the loss of feed when the feed housing is removed from the pole, said sheath means having upper and lower ends and being slideably mounted on and encircling the pole;
- bird feed receptacle means for facilitating filling of the feed housing means with bird feed, said receptacle means being positioned above the feed housing and around the pole located at the upper end of the sheath means; and
- a bird feed tray located beneath the lower end of the sheath means to the feed tray, whereby the sheath means, feed tray, receptacle means, and feed housing are slideable as a single unit up and down along the pole.

13. The container fill and pole protection system as in claim 12 wherein the sheath means comprises an elongated tubular member.

14. The container fill and pole protection system as in claim 12 wherein the bird feed receptacle means comprises a funnel member configured to be positioned atop the feed housing.

15. The container fill and pole protection system as in claim 12 wherein the bird feed receptacle means comprises upstanding wall means for preventing bird feed from contacting the sheath means and the pole and for assisting in the prevention of loss of feed when the feed housing is removed from the pole.

16. The container fill and pole protection system as in claim 15 wherein the wall means comprises a sleeve type member configured to circumscribe the upper end of the pole.

17. The container fill and pole protection system as in claim 12 wherein the sheath means and the bird feed receptacle means comprise a single, integral unit, the sheath means extending down from the bird feed receptacle means.

18. The container fill and pole protection system as in claim 12 wherein the sheath means and the bird feed tray comprise a single, integral unit, the sheath means extending up from the bird feed tray.

19. The container fill and pole protection system as in claim 12 wherein the sheath means, the bird feed receptacle means and the bird feed tray comprise a single integral unit, the sheath means extending between the bird feed receptacle means and the bird feed tray.

20. The container fill and pole protection system as in claim 12 wherein the feed housing and sheath means each comprise upper and lower sections, the upper feed housing section, the upper sheath means section, and the bird feed receptacle means comprising a single, integral upper unit, and the lower feed housing section, the lower sheath means section, and the bird feed tray comprising a single, integral lower unit, and means to attach the upper and lower units, whereby when the upper and lower units are attached, the feed housing and sheath means extend from the bird feed receptacle means to the bird feed tray.

* * * * *